United States Patent [19]

Yokotsuka et al.

[11] 3,717,470
[45] Feb. 20, 1973

[54] HYDROLYSIS OF GLUTAMINE WITHIN FOODS AND BEVERAGES TO GLUTAMIC ACID

[75] Inventors: Tamotsu Yokotsuka, Nagareyama; Takashi Iwaasa; Mitsuharu Fujii, both of Noda-shi, all of Japan

[73] Assignee: Kikkoman Shoyu Co., Ltd., Noda, Noda-shi, Japan

[22] Filed: April 15, 1971

[21] Appl. No.: 134,492

[30] Foreign Application Priority Data

Nov. 26, 1970 Japan ............................... 45/103677

[52] U.S. Cl. ...................... 99/16, 99/28, 99/100 R, 99/106, 99/107, 99/140 R, 195/29, 195/65
[51] Int. Cl. ............................ A23l 1/26, C12d 13/06
[58] Field of Search ........ 99/16, 140 R, 28, 106, 107, 99/100; 195/28 R, 29, 65

[56] References Cited

UNITED STATES PATENTS

| 2,687,961 | 8/1954 | Ellis | 99/107 |
|---|---|---|---|
| 2,665,988 | 1/1954 | Searle | 99/16 |
| 2,924,521 | 2/1960 | Hewitt et al. | 99/100 |

OTHER PUBLICATIONS

Bray et al., Enzymic Hydrolysis of Glutamine, Biochemical Journal, 1949, Vol. 44, p. 625–627

Primary Examiner—Morris O. Wolk
Assistant Examiner—Stephen B. Davis
Attorney—Cushman, Darby & Cushman

[57] ABSTRACT

Glutaminase is added to various foods or beverages containing glutamine. The food or beverage is kept at 10° C to 70° C for at least 0.5 hours so as to hydrolyze the glutamine to glutamic acid and prevent the formation of pyroglutamic acid.

6 Claims, No Drawings

HYDROLYSIS OF GLUTAMINE WITHIN FOODS AND BEVERAGES TO GLUTAMIC ACID

The present invention relates to a process for preparing foods and beverages, which comprises subjecting free glutamine contained in food and beverage materials to the action of glutaminase to hydrolyze the same, resulting in an increase of the content of glutamic acid in said materials.

Generally, in preparing foods and beverages, especially those which are required to be delicious to the taste, there have been used those animal or vegetable materials which are originally rich in the content of glutamic acid or other flavoring substances. For example, in preparing seasonings there are used such protein-rich materials as soybean or wheat gluten, which are hydrolyzed with acids or enzymes to isolate glutamic acid in free state for use as a principal factor of enhancing the taste. When materials poor in the content or glutamic acid are used in the preparation of foods and beverages, addition of an intensifying or improving agent for smell and taste is an ordinary practice.

Seasonings distinguished for flavoring effect, such as L-glutamic acid, 5'-inosic acid, or 5'-guanylic acid are added in a wide range of processed foods and beverages that are especially required to be delicious, including, for example, pickles, seasonings, canned meats and vegetables, tomato catchups, various juices, etc.

It has heretofore been known that some of these food and beverage materials contain glutamine which is readily convertible into glutamic acid. However, said glutamine is transformed into pyroglutamic acid devoid of flavoring effect during the course of conventional processing treatments such as heating, and during the storage of processed materials.

As a result of studies upon the means for an effective utilization of said glutamine, the present inventors have now accomplished a process for preparing foods and beverages excellent in deliciousness, which comprises adding glutaminase to the glutamine-containing materials to convert the glutamine into glutamic acid by hydrolysis.

The content of free glutamine and free glutamic acid in the raw materials for preparation of foods and beverages and the amount of free glutamic acid in the processed commercial products prepared from said materials are as shown in Tables 1 and 2.

TABLE 1.

Content of free glutamine and free glutamic acid in various food and beverage materials

| Item | Free glutamine | glutamic acid |
|---|---|---|
| Cucumber | 0.40 | 0.18 |
| Eggplant | 0.78 | 0.16 |
| Chinese cabbage (Hakusai) | 1.45 | 0.24 |
| Japanese radish | 1.58 | 0.07 |
| Green asparagus | 1.65 | 0.79 |
| Tomato | -b 1.35 | 0.90 |
| Grape | 0.42 | 0.14 |
| Mushroom | 1.27 | -b 1.67 |
| Enokitake (Flammulina veltipes | -b 0.48 | 0.71 |
| Pork | 0.37 | 0.31 |
| Beef | 0.12 | 0.28 |
| Whale meat | 0.11 | 0.11 |

Table 2.

Content of free glutamic acid in various commercial foods and beverages

| Item | Free glutamic acid |
|---|---|
| Canned asparagus | 0.20 |
| Pickled radish (japanese style) | 209 |
| Tomator juice (a) | 1.62 |
| Tomato juice (b) | 2.11 |
| Tomato catchup (a) | 2.08 |
| Tomato catchup (b) | 3.16 |
| Canned mushroom | 1.30 |
| Canned beef | 2.90 |

The samples of the materials were treated in a juicer and the juices obtained or the supernatant liquids separated by centrifugation were analyzed for their content of glutamine and glutamic acid. In the Tables, the amounts are shown in terms of mg per 1 ml of each juice or supernatant liquid thereof.

To take the case of radish as an example, the Japanese-style pickle products (so-called Takuan) are sometimes required to contain up to 2.09 mg/ml of free glutamic acid, and a large amount of L-glutamic acid is usually added to meet the requirement. The content of free glutamic acid in the radish for use as the material is as low as 0.07 mg/ml, whereas the content of free glutamine is as high as 1.58. However, said glutamine has heretofore never been utilized as the flavoring component, because of its conversion into pyroglutamic acid.

An object of the present invention is to provide a process for preparing foods and beverages having an excellent deliciousness by utilizing to advantage such free glutamine in food and beverage materials that had heretofore never been utilized. Another object of the invention is to provide very useful foods and beverages which are so rich in natural flavor that the additional L-glutamic acid becomes quite unnecessary or can be saved to a great extent, the addition of which had conventionally been done during the processing, or either before or after the processing. A further object of the present invention is to provide a means of preparing foods and beverages excellent in flavor by preventing the conversion of glutamine in the raw materials into pyroglutamic acid, the formation of which is considered undesirable for foods and beverages because of its bitter taste and phenolic odor.

In the present process, free glutamine in the raw materials is converted into free glutamic acid by hydrolysis of the amide linkage. The hydrolysis of the amide linkage can be effected either enzymically or chemically by use of acids, etc. In the preparation of foods, the enzymic means is preferably used because chemical decompositions accompanying the formation of byproducts are undesirable in most of the cases.

Glutaminase for use as the enzyme capable of hydrolyzing the amide linkage of glutamine may be of any origin. Ordinarily, there is advantageously used glutaminase produced by microorganisms such as yeasts, molds, bacteria, and actinomycetes. Examples include yeasts such as *Saccharomyces rouxii* (ATCC 13356), *Hansenula muraki* (IAM 4059), *Cryptococcus albidus* (ATCC 20293 and 20294); molds such as *Aspergillus oryzae* (IAM 2600), *Aspergillus soja* (IAM 2665), *Aspergillus awamori* (ATCC 14335), *Aspergillus saitoi* (ATOC 14332), *Penicillium chrysogenum* (IAM 7106); bacteria such as *Pseudomonas fluorescens*

(ATCC 21541), Pseudomonas ovalis (R 962), *Bacillus megatherium* (NRRL B-939), *Escherichia coli B* (IAM 1268); actinomycetes such as *Streptomyces globisporus* (NRRL B-2872), *Streptomyces griseus* (ATCC 101137). Glutaminase produced by other suitable microorganisms may be used.

There is some foodstuff which is to be process by treatment at relatively high temperatures, or which is to be processed to finished products containing high concentrations of common salt. In such cases, suitable thermo-stable enzyme or salt resistant enzyme is used.

Microorganisms capable of producing thermostable glutaminase include *Bacillus megatherium* NRRL B–939, *Pseudomonas ovalis* 3 – 5, *Pseudomonas reptilivora* S 1105, *Serratia marcescens* IAM 1184, *Achromobactor liquefaciens* TR–9, *Bacterium succinicum* IAM 1017, etc. Microorganisms capable of producing salt resistant glutaminase include *Proteus vulgaris* IAM 1025, *Pseudomonas fluorescens* IAM 1179, *Pseudomonas ovalis* R 962, *Pseudomonas schuylkilliensis* IAM 1154 (NRRL B–6), etc.

These microorganisms are cultured under aerobic conditions using culture media which are suitable for producing ordinary glutaminase. The cultivation may be effected either by the stationary method or by the aerating and agitating method. For the medium, ordinary substrates which are consumable by the microorganism to be cultured are used. Examples include carbon sources such as glucose, maltose, sucrose, dextrin, starch, and the like, and nitrogen sources such as soybean cake, soybean meal, gluten, yeast extract, peptone, meat extract, corn-steep liquor, ammonium salts, nitrates, etc. These substances are used either alone or in admixtures. If necessary, other salts of magnesium, calcium, potassium, sodium, phosphoric acid, a trace amount of iron, manganese, etc., are used. The microorganisms can also be cultured by use of a medium containing in addition to the above-said nutrient sources other substrates for glutaminase such as L-glutamine.

The glutaminase thus produced may be used as contained in the microorganism cells, since glutaminase is ordinarily an intracellular enzyme. However, for the sake of efficiency, it is used in the form of microorganism cells suspended liquor obtained by autolysis of the exhausted broth, or in the form of an aqueous suspension of triturated microorganism cells, or more preferably in view of food preparation, in the form of crude enzyme extract, powder, or purified enzyme. According to the type of foods and beverages, glutaminase in any form of the above-mentioned may be properly selected for use therein.

For preparing an extracted enzyme, a wide variety of techniques customary in the ordinary enzyme extraction may be utilized. For instance, after being subjected to an ultrasonic wave treatment, trituration, or autolysis, the cultured microorganism mass is extracted with water or an aqueous salt solution such as a buffer solution. Purified enzyme is obtained from the said enzyme extract solution by means of a proper combination of fractional precipitation with organic solvents such as, for example, ethyl alcohol or acetone; salting out with ammonium sulfate or sodium sulfate; adsorption-elution with ion-exchange resin or cellulose; and gel filtration with Sephadex or Bio-gel.

Now, in preparing foods and beverages by use of these enzyme preparations, any of the materials containing free glutamine may be used as the raw material, including meats such as pork, beef, whale meat; edible roots and vegetable fruits such as cucumber, tomato, radish, chinese cabbage, etc. Among these materials those which contain larger amounts of free glutamine are favorable.

The materials containing free glutamine may be processed using techniques customary in preparation of each finished product. A predetermined amount of glutaminase can be added in any step of the processing to hydrolyze glutamine. In the case where the material is treated at high temperatures, glutaminase is preferably added prior to the conversion of free glutamine into pyroglutamic acid by heat treatment so that glutamine is able to be hydrolyzed to form glutamic acid before said treatment.

The amount of glutaminase to be added can be properly controlled according to the content of glutamine in the raw material. In general, the addition of glutaminase in an amount of at lease 0.1 percent by weight based on the food or beverage material is sufficient.

Glutaminase is preferably used at temperatures within a range of 10° to 70° C, in which temperature range glutaminase can remain active.

In preparing foods and beverages, such as pickled vegetables, which require relatively long period of time, glutaminase can be added at the beginning of processing, that is at the beginning of steeping vegetables, and thereafter steeped vegetables are treated in ordinary ways. However, it is desirable to keep the food or beverage material at 10° to 70° C at least for 0.5 hours for the complete hydrolysis of glutamine.

As used herein ATCC refers to cultures deposited in the American Type Culture Collection, Rockville, Maryland, NRRL applies to cultures deposited in the Northern Utilization Research and Development Division, U.S. Department of Agriculture, Peoris, Illinois and IAM refers to cultures deposited in the Japanese Federation of Culture Collections of Microorganisms in Tokyo, Japan.

The invention is further illustrated below by referring to Examples.

EXAMPLE 1

According to the ordinary procedure, tomato was washed, crushed, heated, and squeezed to obtain tomato juice. To 1 Kg of the juice, was added 1 g of a glutaminase preparation (acetone-dried fungus mass of cultured *Cryptococcus albidus* (ATCC 20293)) and mixed thoroughly. Then the mixture was vacuum-concentrated in the ordinary way to obtain 0.52 liters of tomato puree. The content of free glutamic acid in 1 ml of the supernatant liquor obtained by centrifuging said puree was 3.26 mg, whereas the content was 1.82 mg in the case of puree prepared in the same manner as that mentioned above except that no glutaminase was used.

EXAMPLE 2

4 Kilograms of Chinese cabbage cut in halves or quarters and 200 g of common salt were placed in a 10-liter polyethylene vessel and a weight was applied thereon. When sufficient juice was squeezed out of the Chinese cabbage to steep the latter, 2 g of a glutaminase preparation (an extracted enzyme obtained from the microorganism mass of cultured *Escherichia coli*) was added to the juice. Then the steeping was further continued under a somewhat lighter weight. A control steeping was run in the same way as that mentioned above, except that no glutaminase was used.

After having been steeped for 2 months at the room temperature the Chinese cabbage was crushed in a juicer to obtain juice. The content of free glutamic acid in 1 ml of the juice was determined to be 1.02 mg, whereas the content was 0.21 mg in the case of control steeping.

EXAMPLE 3

One kilogram of radish cut into pieces was sprayed with 30 g of common salt in a vessel, and a weight was applied thereon. When sufficient volume of juice was squeezed out, 1 g of the same glutaminase preparation as that in Example 2 was added into the vessel, and the steeping was further continued. After having been steeped for several days at room temperature the radish was crushed in a juicer to obtain juice. The content of free glutamic acid in 1 ml of the juice was determined to be 1.06 mg, whereas the content was 0.07 mg in the case where no glutaminase was added.

Example 4

4 Kilograms of eggplant cut in halves was steeped in 1.3 liters of water containing 400 g of common salt and 4 g of a glutaminase preparation (extracted enzyme obtained from cultured *Aspergillus soja* IAM 2665). After termination of steeping the content of glutamic acid was determined in the same manner as in Example 2, and found to be 0.59 mg/ml, whereas the content was 0.15 mg/ml in the case where no glutaminase was added.

Example 5

To 100 g of fresh pork cut into pieces, was added 100 ml of water and 0.5 g of a glutaminase preparation obtained in the same manner as in Example 1. The enzymic reaction was allowed to proceed at 40° C for 1 hour with occasional stirring. After completion of the reaction, the reaction mixture was heated at 100° C for 5 minutes and then centrifuged. The content of glutamic acid and glutamine in 1 ml of the supernatant liquor was determined to be 0.312 mg and 0.020 mg respectively, whereas the content was 0.153 mg and 0.102 mg respectively in the case where the pork was treated in the same manner as above-mentioned except for omission of the addition of glutaminase.

EXAMPLE 6

One kilogram of fresh tomato was washed with water and crushed to obtain juice. One gram of a glutaminase preparation (extracted enzyme obtained from fungus cells of cultured *Cryptococcus albidus* (ATCC 20294)) was added to the juice and mixed thoroughly, after which the mixture was left standing at 40° C for 1 hour. Then, after having been kept at 100° C for 2 minutes the mixture was centrifuged to obtain tomato juice. The content of free glutamic acid in 1 ml of said juice was 1.82 mg, whereas the content was 0.73 mg in the case where tomato was treated in the same manner as above mentioned except that no glutaminase was used.

What is claimed is:

1. A process for preparing foods or beverage rich in natural flavor and taste, which comprises adding at least 0.1 percent (W/W) of a glutaminase to a food or beverage material containing glutamine prior to or in the course of processing, on the basis of the food or beverage material, and keeping the food or beverage material at 10°–70° C at least for 0.5 hours, thereby to hydrolyze the glutamine to glutamic acid and prevent the glutamine from conversion to pyro compound.

2. A process according to claim 1, wherein the glutaminase is a thermo-stable glutaminase.

3. A process according to claim 1, wherein the glutaminase is a salt resistant glutaminase.

4. A process according to claim 1, wherein the glutaminase is a product produced by one microorganism selected from the group consisting of yeasts, molds, bacteria, and actinomycetes.

5. A process according to claim 4, wherein the glutaminase is a product produced by one microorganism selected from the group consisting of *Saccharomyces rouxii*, *Hansenula muraki*, *Cryptococcus albidus*, *Aspergillus oryzae*, *aspergillus soja*, *Aspergillus awamori*, *Aspergillus saitoi*, *Penicillium chrysogenum*, *Pseudomonas fluorescens*, *Pseudomonas ovalis*, *Pseudomonas reptilivora*, *Pseudomonas schuylkilliensis*, *Bacillus megatherium*, *Escherichia coli*, *Serratia marcescens*, *Achromobacter liquefaciens*, *Bacterium succinicum*, *Proteus vulgaris*, *Streptomyces globisporus*, and *Streptomyces griseus*.

6. A process according to claim 4, wherein the glutaminase is the product produced by one microorganism selected from the group consisting of *Saccharomyces rouxii* ATCC 13356, *Hansenula muraki* IAM 4059, *Cryptococcus albidus* ATCC 20293, *Cryptococcus albidus* ATCC 20294, *Aspergillus oryzae* IAM 2600, *Aspergillus soja* IAM 2665, *Aspergillus awamori* ATCC 14335, *Aspergillus saitoi* ATCC 14332, *Penicillium chrysogenum* IAM 7106, *Pseudomonas fluorescens* ATCC 21541, *Pseudomonas ovalis* R 962, *Pseudomonas reptilivora* S 1105, *Pseudomonas schuylkilliensis* NRRL B–6, *Bacillus megatherium* NRRI B–939, *Escherichia coli* B IAM 1268, *Serratia marcescens* IAM 1184, *Achromobacter liquefaciens* TR–9, *Bacterium Succinicum* IAM 1017, *Proteus vulgaris* IAM 1025, *Streptomyces globisporus* NRRL B–2872, and *Streptomyces griseus* ATCC 10137.

* * * * *